United States Patent
Chu

(10) Patent No.: US 9,148,211 B2
(45) Date of Patent: Sep. 29, 2015

(54) METHOD OF JOINTLY ENCODING CHANNEL STATE INFORMATION REPORTS AND HYBRID AUTOMATIC REPEAT REQUEST FEEDBACKS AND RELATED COMMUNICATION DEVICE

(71) Applicant: HTC Corporation, Taoyuan County (TW)

(72) Inventor: Feng-Seng Chu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 128 days.

(21) Appl. No.: 13/947,098

(22) Filed: Jul. 21, 2013

(65) Prior Publication Data

US 2014/0022991 A1 Jan. 23, 2014

Related U.S. Application Data

(60) Provisional application No. 61/673,745, filed on Jul. 20, 2012.

(51) Int. Cl.
| | |
|---|---|
| *H04W 4/00* | (2009.01) |
| *H04B 7/06* | (2006.01) |
| *H04L 1/16* | (2006.01) |
| *H04L 1/00* | (2006.01) |
| *H04L 1/18* | (2006.01) |

(52) U.S. Cl.
CPC ............ *H04B 7/0636* (2013.01); *H04L 1/1671* (2013.01); *H04L 1/0026* (2013.01); *H04L 1/0057* (2013.01); *H04L 1/0071* (2013.01); *H04L 1/1812* (2013.01)

(58) Field of Classification Search
CPC .... H04W 24/10; H04W 52/48; H04L 1/0026; H04L 1/0031

USPC .............. 370/328–330, 335–338, 342–345, 370/532–541
See application file for complete search history.

(56) References Cited

U.S. PATENT DOCUMENTS

| | | | |
|---|---|---|---|
| 2009/0158109 A1* | 6/2009 | Park et al. ...................... | 714/748 |
| 2009/0158110 A1* | 6/2009 | Park et al. ...................... | 714/748 |
| 2009/0207725 A1 | 8/2009 | Zhang | |
| 2009/0245212 A1 | 10/2009 | Sambhwani | |
| 2011/0249578 A1* | 10/2011 | Nayeb Nazar et al. ........ | 370/252 |
| 2013/0117622 A1* | 5/2013 | Blankenship et al. ........ | 714/751 |
| 2013/0194951 A1* | 8/2013 | Kim et al. ..................... | 370/252 |

(Continued)

FOREIGN PATENT DOCUMENTS

| | | |
|---|---|---|
| WO | 2011100646 A1 | 8/2011 |
| WO | 2012063754 A1 | 5/2012 |

OTHER PUBLICATIONS

European patent application No. 13020055.3, European application filing date: Jul. 19, 2013, European Search Report mailing date: Oct. 30, 2013.

(Continued)

*Primary Examiner* — Thai Hoang
(74) *Attorney, Agent, or Firm* — Winston Hsu; Scott Margo

(57) ABSTRACT

A method of jointly encoding channel state information (CSI) reports and hybrid automatic repeat request (HARQ) feedbacks for a user equipment in a wireless communication system includes generating a first data stream based on a plurality of input streams of CSI reports or a combination of a plurality of input streams of CSI reports and HARQ feedbacks; and transmitting the first data stream to a network of the wireless communication system.

12 Claims, 7 Drawing Sheets

(56) References Cited

U.S. PATENT DOCUMENTS

| | | | |
|---|---|---|---|
| 2013/0235853 A1* | 9/2013 | Papasakellariou et al. | 370/336 |
| 2013/0301550 A1* | 11/2013 | Kim et al. | 370/329 |
| 2014/0003452 A1* | 1/2014 | Han et al. | 370/474 |
| 2014/0064159 A1* | 3/2014 | Larsson et al. | 370/280 |
| 2014/0233520 A1* | 8/2014 | Lee et al. | 370/329 |

OTHER PUBLICATIONS

Office action mailed on Nov. 18, 2013 for the European application No. 13020055.3, filing date Jul. 19, 2013, p. 1-5.

Texas Instruments, "Separate Rank and CQI Feedback in PUCCH", 3GPP TSG RAN WG1 #52, R1-080708, Feb. 11-15, 2008, Sorrento, Italy, XP002715030.

Texas Instruments, "Outstanding details on Rel-10 HARQ-ACK transmission", 3GPP TSG RAN WG1 #62, R1-104952, Aug. 23-27, 2010, Madrid, Spain, XP002715042.

Office action mailed on Jun. 5, 2014 for the European application No. 13020055.3, filing date: Jul. 19, 2013, p. 1-4.

3GPP TS 36.212 V10.6.0, Jun. 2012.

3GPP TS 36.213 V10.5.0, Mar. 2012.

* cited by examiner

METHOD OF JOINTLY ENCODING CHANNEL STATE INFORMATION REPORTS AND HYBRID AUTOMATIC REPEAT REQUEST FEEDBACKS AND RELATED COMMUNICATION DEVICE

CROSS REFERENCE TO RELATED APPLICATIONS

This application claims the benefit of U.S. Provisional Application No. 61/673,745, filed on Jul. 20, 2012 and entitled "Method and Apparatus to jointly encode CSI reports and HARQ feedbacks", the contents of which are incorporated herein in their entirety.

BACKGROUND OF THE INVENTION

1. Field of the Invention

The present invention relates to a method used in a wireless communication system and related communication device, and more particularly, to a method of jointly encoding channel state information (CSI) reports and hybrid automatic repeat request (HARQ) feedbacks in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, a radio access network known as an evolved universal terrestrial radio access network (E-UTRAN) includes a plurality of evolved Node-Bs (eNBs) for communicating with a plurality of user equipments (UEs) and communicates with a core network including a mobility management entity (MME), serving gateway, etc for NAS (Non Access Stratum) control.

An LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (COMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

In the LTE-A system, since a UE may be served by multiple cells, the UE may need to report Hybrid Automatic Repeat Request (HARQ) acknowledgement/negative acknowledgements (ACKs/NACKs) to each cell at the same time. In the prior art, a physical uplink control channel (PUCCH) format 3 including 48 bits is defined to convey the HARQ ACKs/NACKs for advanced techniques such as CA. Please refer to FIG. 1, which is a schematic diagram of a conventional process 10 for encoding HARQ ACKs/NACKs in the CA technology when the total number of HARQ ACK/NACK bits $N_{A/N}^{PUCCH\,format\,3}$ is less than 11 (i.e., $N_{A/N}^{PUCCH\,format\,3} \leq 11$) As shown in FIG. 1, the HARQ ACKs/NACK bits $a_0, a_1, a_2, \ldots, a_{N_{A/N}^{PUCCH\,format\,3}-1}$ (denoted by $a_n$) are encoded into a data stream $b_0, b_1, b_2, \ldots, b_{31}$ (denoted by $b_i$) through a Reed-Muller code RM(32, O) first (step 100), wherein O is the number of input bits, $$\tilde{b}_i = \sum_{n=0}^{N_{A/N}^{PUCCH\,format\,3}-1} (a_n \cdot M_{i,n}) \bmod 2,$$

i=0, 1, 2, ..., 31, and the basis sequences $M_{i,n}$ are defined in Table 1. Then, an output data stream $b_0, b_1, b_2, \ldots, b_{B-1}$ (denoted by $b_j$) is obtained by circular repetition of the data stream $\tilde{b}_0, \tilde{b}_1, \tilde{b}_2, \ldots, \tilde{b}_{31}$ i.e., $b_j = \tilde{b}_{(i\,mod\,32)}$ (step 102), wherein j=0, 1, 2, ..., B-1, B is the bandwidth for transmitting the HARQ ACKs/NACKs. Please continue referring to FIG. 2, which is a schematic diagram of a conventional process 20 for encoding HARQ ACKs/NACKs in the CA technology when the total number of HARQ ACK/NACK bits $N_{A/N}^{PUCCH\,format\,3}$ equals a number between 11 and 21 (i.e., $11 < N_{A/N}^{PUCCH\,format\,3} \leq 21$) As shown in FIG. 2, the HARQ ACKs/NACK bits $a_0, a_1, a_2, \ldots, a_{N_{A/N}^{PUCCH\,format\,3}-1}$ (denoted by $a_n$) are de-multiplexed into two data streams $a_0, a_1, a_2, \ldots, a_{\lceil N_{A/N}^{PUCCH\,format\,3}/2 \rceil-1}$ (denoted by $\tilde{a}_m$) and $a_{\lceil N_{A/N}^{PUCCH\,format\,3}/2 \rceil}, a_{\lceil N_{A/N}^{PUCCH\,format\,3}/2 \rceil+1}, a_{\lceil N_{A/N}^{PUCCH\,format\,3}/2 \rceil+2}, \ldots, a_{\lceil N_{A/N}^{PUCCH\,format\,3}/2 \rceil-1}$, (denoted by $\tilde{\tilde{a}}_l$) first (step 200). Then, the data streams $a_0, a_1, a_2, \ldots, a_{\lceil N_{A/N}^{PUCCH\,format\,3}/2 \rceil-1}$ and $a_{\lceil N_{A/N}^{PUCCH\,format\,3}/2 \rceil}, a_{\lceil N_{A/N}^{PUCCH\,format\,3}/2 \rceil+1}, a_{\lceil N_{A/N}^{PUCCH\,format\,3}/2 \rceil+2}, \ldots, a_{N_{A/N}^{PUCCH\,format\,3}-1}$, are encoded through the Reed-Muller code RM(32, O) (steps 202, 204) and truncated to 24 bits (steps 206, 208) to obtain data streams $\tilde{b}_i$ and $\tilde{\tilde{b}}_i$, respectively, wherein $$\tilde{b}_i = \sum_{n=0}^{\lceil N_{A/N}^{PUCCH\,format3/2} \rceil-1} (a_n \cdot M_{i,n}) \bmod 2,$$

$$\tilde{\tilde{b}}_i = \sum_{n=0}^{N_{A/N}^{PUCCH\,format3}-\lceil N_{A/N}^{PUCCH\,format3/2} \rceil-1} \left( a_{\lceil N_{A/N}^{PUCCH\,format3/2} \rceil+n} \cdot M_{i,n} \right) \bmod 2,$$

i=0, 1, 2, ..., 23, and the basis sequences $M_{i,n}$ are defined in Table 1. Finally, an output data stream $b_0, b_1, b_2, \ldots, b_{B-1}$ (denoted by $b_1$) is obtained by the alternate concatenation of the bit sequences $\tilde{b}_0, \tilde{b}_1, \tilde{b}_2, \ldots, \tilde{b}_{23}$ and $\tilde{\tilde{b}}_0, \tilde{\tilde{b}}_1, \tilde{\tilde{b}}_2, \ldots, \tilde{\tilde{b}}_{23}$ (step 210) as the following pseudo-code:

---
Set i, j = 0
while i < B
    $b_i = \tilde{b}_j$, $b_{i+1} = \tilde{b}_{j+1}$, $b_{i+2} = \tilde{\tilde{b}}_j$, $b_{i+3} = \tilde{\tilde{b}}_{j+1}$
    i = i + 4, j = j + 2
end while

---

Therefore, in the conventional processes 10 and 20, the maximum number of ACK/NACK bits that can be transmitted in the PUCCH format 3 is 10 for frequency division duplex (FDD), and the maximum number of ACK/NACK bits that can be transmitted in the PUCCH format 3 is 20 for time division duplex (TDD). However, it is not enough for certain advanced applications.

TABLE 1

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

Channel state information (CSI) includes channel quality indicator (CQI), precoding matrix indicator (PMI), precoding type indicator (PTI), and/or rank indication (RI). CSI reports are classified into 10 types, 1, 1a, 2, 2a, 2b, 2c, 3, 4, 5, and 6, each type reporting different contents. For example, Type 2 report supports wideband CQI and PMI feedback, and Type 3 report supports RI feedback. When multiple CSI reports for different cells need to be transmitted simultaneously, the 3GPP Rel-10 standard requires the UE to drop reports with lower priorities and to deliver only one CSI report at one time.

In detail, if the UE is configured with more than one serving cell (e.g., the UE and the eNB support CA), the UE transmits a CSI report of only one serving cell in any given subframe. For a given subframe, if a CSI report with PUCCH reporting type 3, 5, 6, or 2a of one serving cell collides with a CSI report with PUCCH reporting type 1, 1a, 2, 2b, 2c, or 4 of another serving cell, the latter CSI with PUCCH reporting type 1, 1a, 2, 2b, 2c, or 4 having lower priority may be dropped. For a given subframe, if a CSI report with PUCCH reporting type 2, 2b, 2c, or 4 of one serving cell collides with a CSI report with PUCCH reporting type 1 or 1a of another serving cell, the latter CSI report with PUCCH reporting type 1, or 1a having lower priority may be dropped.

For a given subframe, if collision among CSI reports of different serving cells with PUCCH reporting type of the same priority occurs, the CSI of the serving cell with lowest serving cell index is reported, and CSI of all other serving cells are dropped.

For a wireless communication system supporting CoMP transmission/reception, a cell may correspond to multiple transmission points (TPs). In case of collision among CSI reports of different TPs corresponding to the same serving cells with PUCCH reporting type of the same priority, the priorities of the CSI reports may be the same according to the prior art. Since the benefit of the CoMP technology originates from coordination among TPs, it is inappropriate to deliver only one CSI report at one time.

Thus, how to deliver more HARQ bits and multiple CSI reports at one time is a topic to be addressed and discussed.

SUMMARY OF THE INVENTION

The present invention therefore provides a method and related communication device for jointly encoding channel state information (CSI) reports and hybrid automatic repeat request (HARQ) feedbacks, so as to transmit information bits more efficiently.

The present invention discloses a method of jointly encoding channel state information (CSI) reports and hybrid automatic repeat request (HARQ) feedbacks for a user equipment in a wireless communication system. The method includes generating a first data stream based on a plurality of input streams of CSI reports or a combination of a plurality of input streams of CSI reports and HARQ feedbacks; and transmitting the first data stream to a network of the wireless communication system.

The present invention further discloses a communication apparatus for jointly encoding CSI reports and HARQ feedbacks. The communication apparatus includes a processing means, a storage unit, and a program code. The program code is stored in the storage unit, and instructs the processing means to execute the following steps: generating a first data stream based on a plurality of input streams of CSI reports or a combination of a plurality of input streams of CSI reports and HARQ feedbacks; and transmitting the first data stream to a network of the wireless communication system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
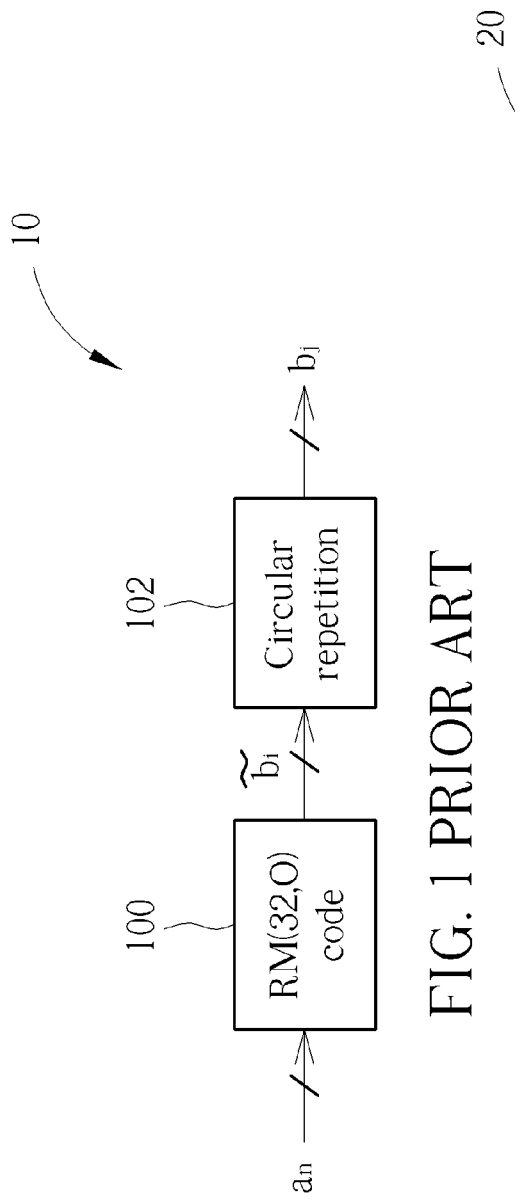
FIG. 1 is a schematic diagram of a conventional process for encoding HARQ ACKs/NACKs.
Figure 2:
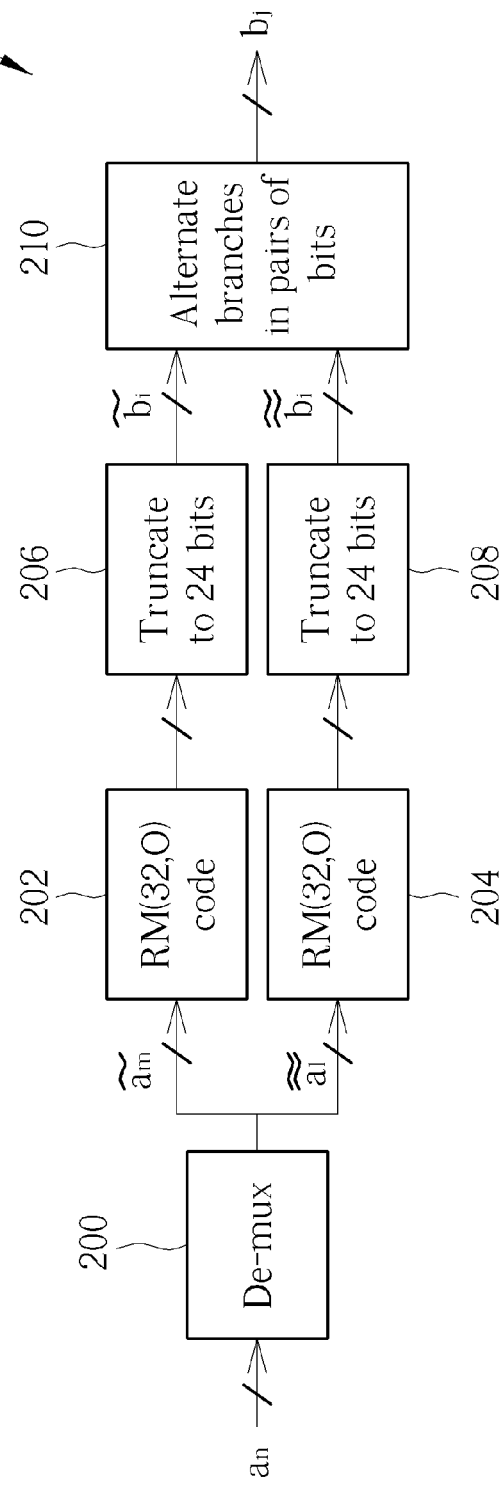
FIG. 2 is a schematic diagram of a conventional process for encoding HARQ ACKs/NACKs.
Figure 3:
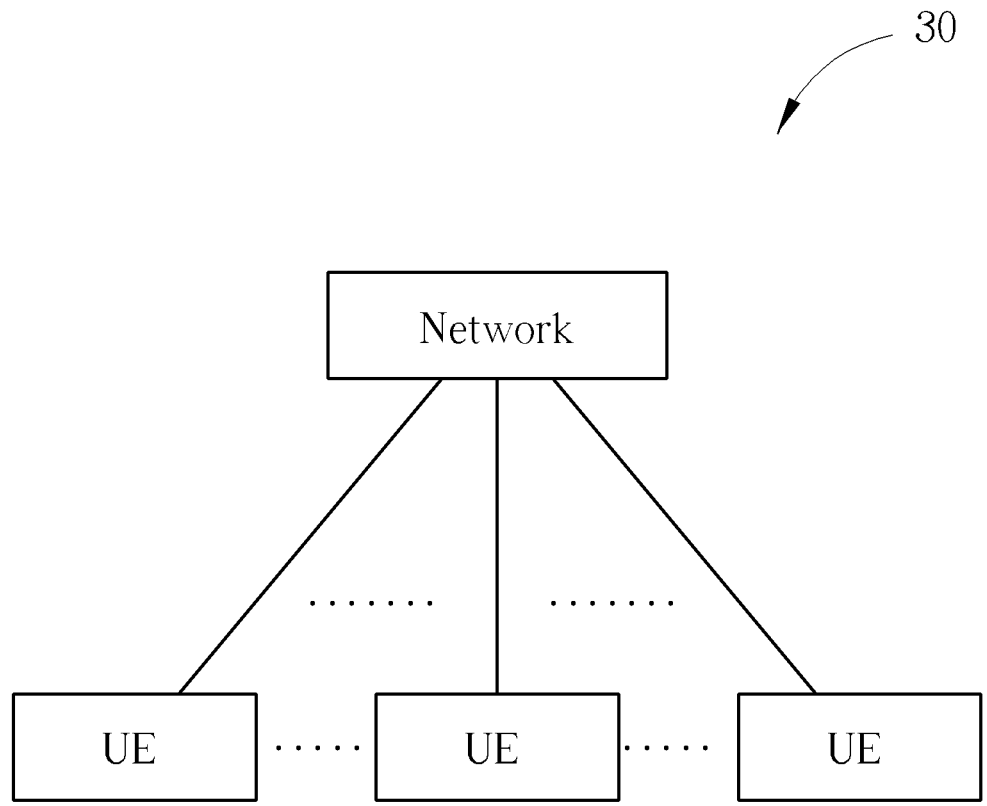
FIG. 3 is a schematic diagram of a wireless communication system according to an example of the present invention.

Please refer to FIG. 3, which is a schematic diagram of a wireless communication system 30 according to an example of the present disclosure. The wireless communication system 30, such as a long term evolution-advanced (LTE-A) system or other mobile communication systems supporting a carrier aggregation (CA) or a coordinated multipoint transmission/reception (COMP) technology, is briefly composed of a network and a plurality of user equipments (UEs). In FIG. 3, the network and the UEs are simply utilized for illustrating the structure of the wireless communication system 30. Practically, the network can be referred as to an E-UTRAN (evolved-UTAN) comprising a plurality of evolved Node-Bs (eNBs) and relays in the LTE-A system. The UEs can be mobile devices such as mobile phones, laptops, tablet computers, electronic books, and portable computer systems. Besides, the network and the UE can be seen as a transmitter or receiver according to transmission direction, e.g., for an uplink (UL), the UE is the transmitter and the network is the receiver, and for a downlink (DL), the network is the transmitter and the UE is the receiver.

Figure 4:
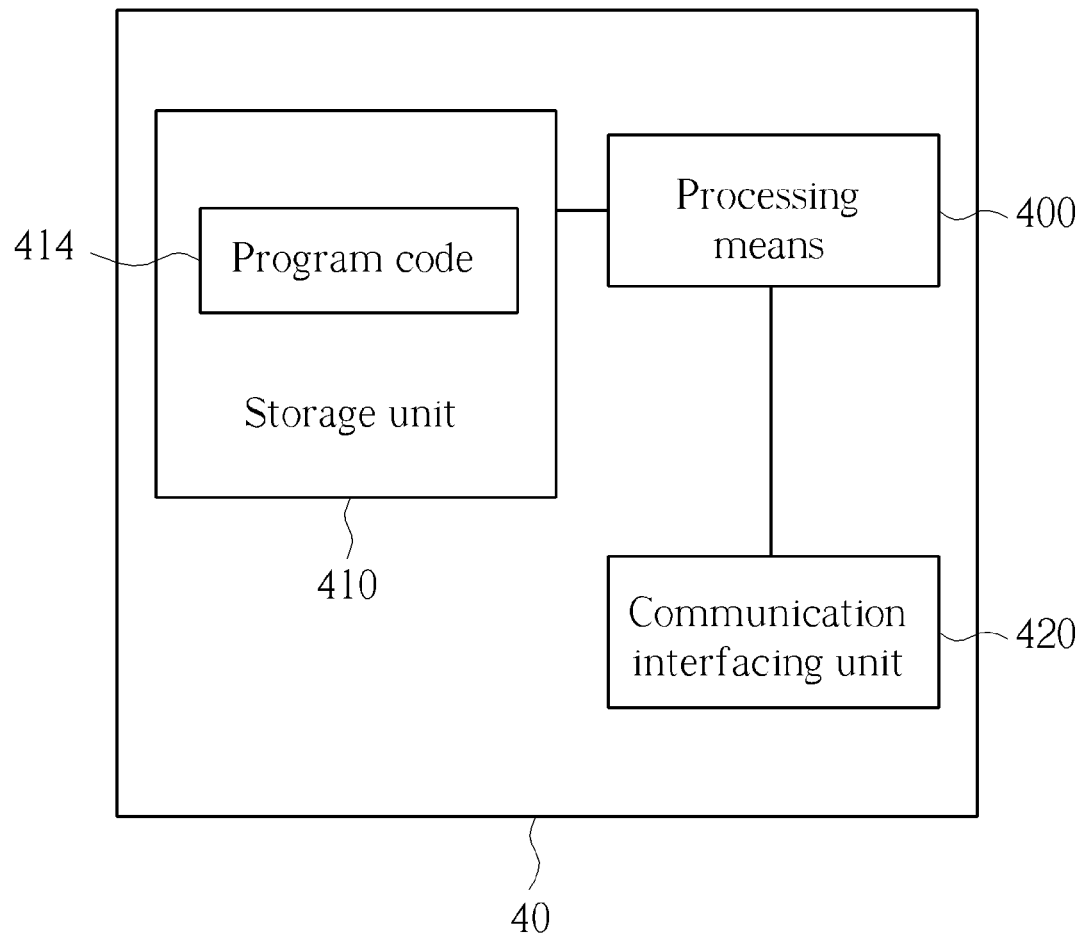
FIG. 4 is a schematic diagram of a communication device according to an example of the present invention.

Please refer to FIG. 4, which is a schematic diagram of a communication device 40 according to an example of the present invention. The communication device 40 can be the UE shown in FIG. 3, but is not limited herein. The communication device 40 may include a processing means 400 such as a microprocessor or an Application Specific Integrated Circuit (ASIC), a storage unit 410 and a communication interfacing unit 420. The storage unit 410 may be any data storage device that can store a program code 414, accessed by the processing means 400. Examples of the storage unit 410 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 420 is preferably a radio transceiver that can transmit and receive signals (e.g., messages or packets) according to processing results of the processing means 400.

Figure 5:
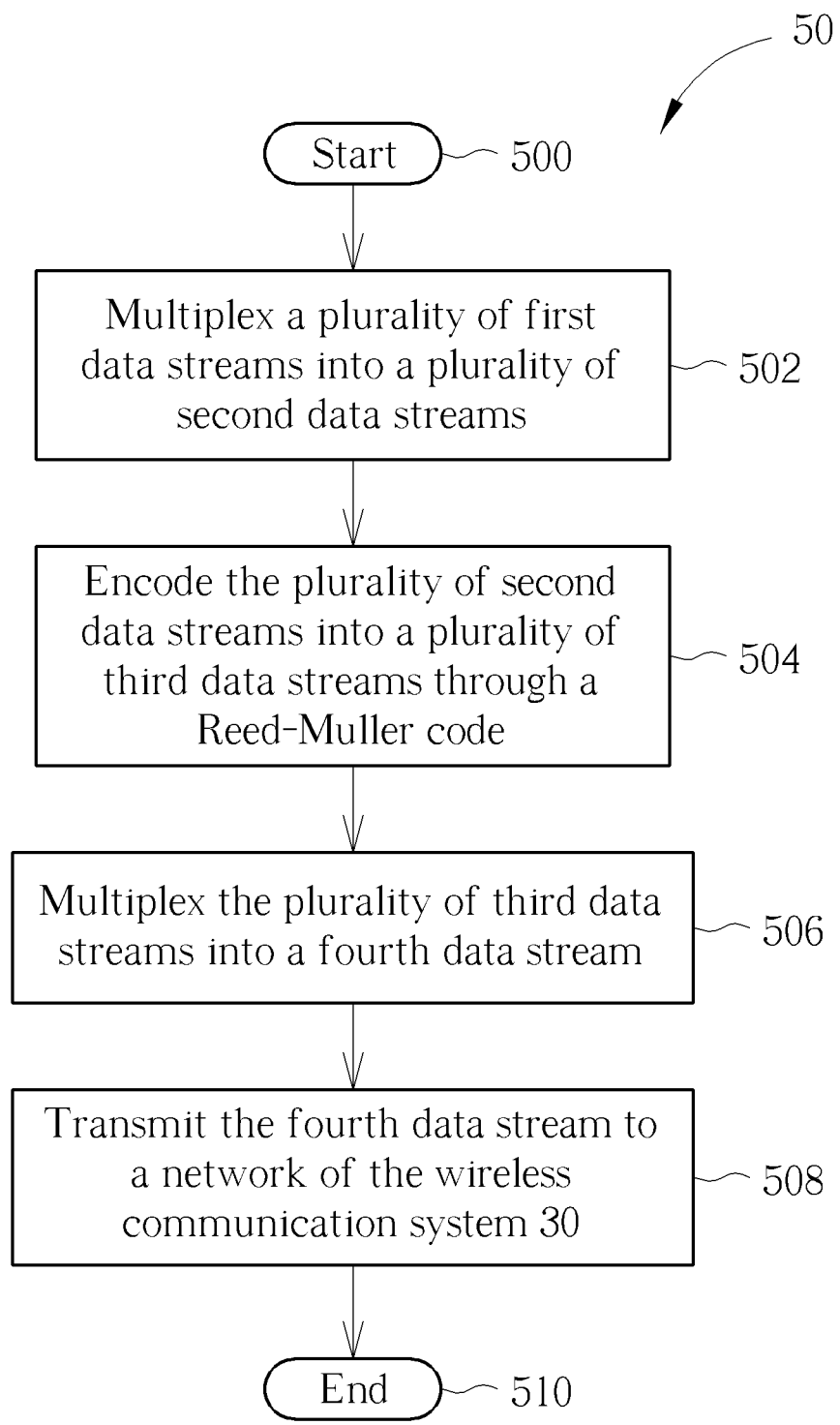
FIG. 5 is a flowchart of a process according to an example of the present invention.

Please refer to FIG. 5, which is a flowchart of a process 50 according to an example of the present invention. The process 50 is utilized for a user equipment to jointly encode channel state information (CSI) reports and hybrid automatic repeat request (HARQ) feedbacks. The user equipment could be the UE in the wireless communication system 30, and is not limited herein. The process 50 may be implemented by the communication device 40 and compiled into the program code 414 for executing the following steps:

Step 500: Start.

Step 502: Multiplex a plurality of first data streams into a plurality of second data streams.

Step 504: Encode the plurality of second data streams into a plurality of third data streams through a Reed-Muller code.

Step 506: Multiplex the plurality of third data streams into a fourth data stream.

Step 508: Transmit the fourth data stream to a network of the wireless communication system 30.

Step 510: End.

According to the process 50, the user equipment may multiplex input data streams as multiple CSI reports, HARQ feedbacks or their combinations (i.e., first data streams) into second data streams, and then encode the second data streams through a Reed-Muller code to obtain third data streams (i.e., each of the second data streams is multiplied by the matrix of the Reed-Muller code). Further, the user equipment may multiplex the third data streams into a fourth data stream (i.e., an output data stream) for transmission. The output data stream may conform to the physical uplink control channel (PUCCH) format 3, but should not be limited herein. As a result, CSI reports and/or HARQ feedbacks can be jointly encoded and delivered at the same time.

Please note that the present invention aims on UE reporting more than one CSI report corresponding to multiple transmission points rather than the current reporting that only one CSI report is delivered. The first multiplexing step (for generating the second data streams), the encoding step (for generating the third data streams) and the second multiplexing step (for generating the fourth data stream) of the process 50 is one of embodiments of the present invention, and these three steps can be integrated into one step as generating an output data stream based on a plurality of input data streams of CSI reports, HARQ feedbacks, or a combination of CSI reports and HARQ feedbacks. Compared with the encoding method of the prior art, the present invention may transmit more information bits at the same time without sacrificing the coding performance.

Figure 6:
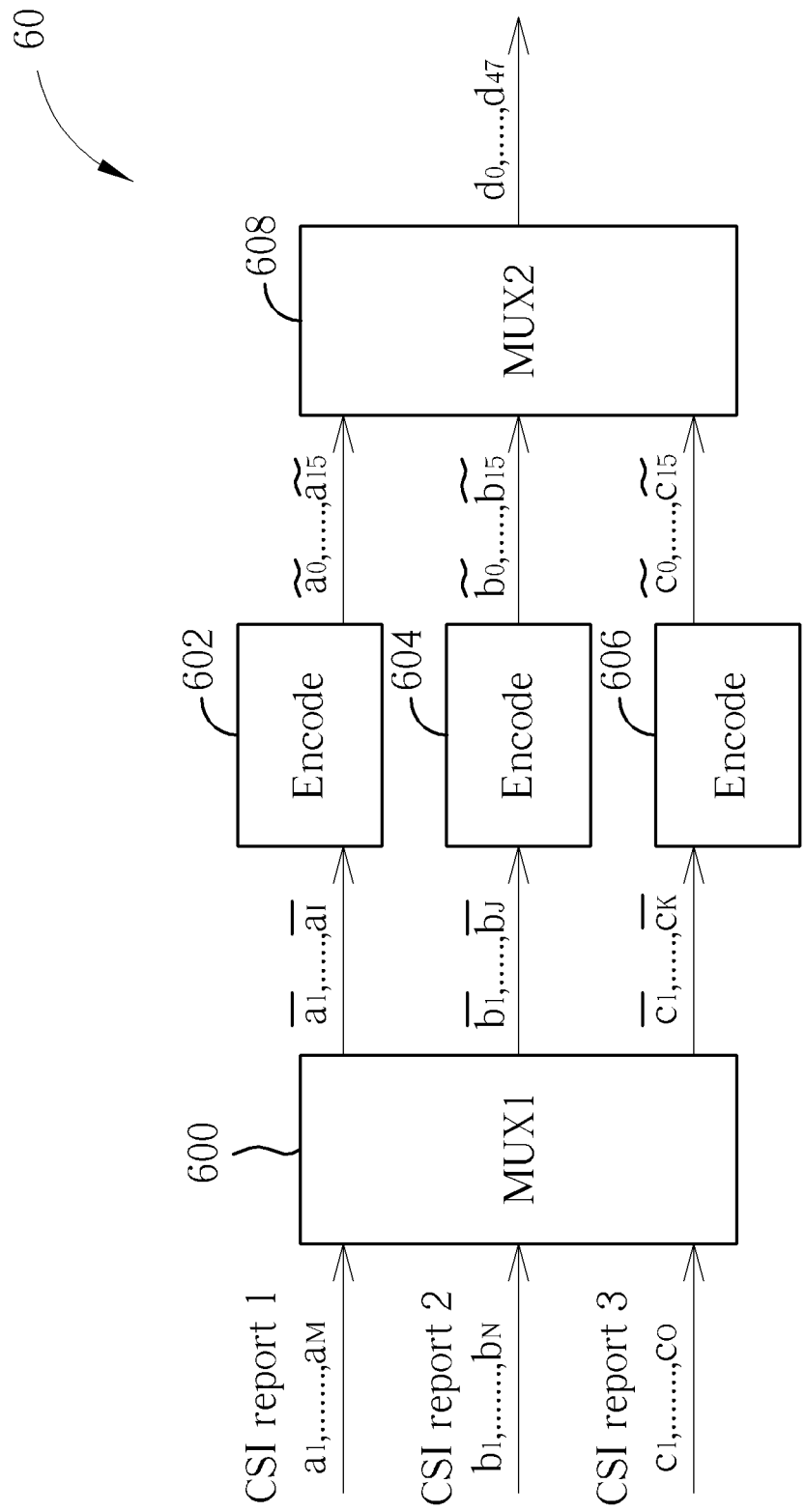
FIG. 6 is a schematic diagram of an encoding scheme according to an example of the present invention.

Please note that the process 50 is an example of the present invention. Those skilled in the art should readily make combinations, modifications and/or alterations on the abovementioned description and examples. For example, please refer to FIG. 6, which illustrates a schematic diagram of an encoding scheme 60 according to an embodiment of the present invention. As shown in FIG. 6, three CSI reports are jointly encoded into a 48-bit data stream to be transmitted to the network simultaneously. The three CSI reports are sent as three binary data streams $a_0, a_1, a_2, \ldots, a_M, b_0, b_1, b_2, \ldots, b_N, c_0, c_1, c_2, \ldots, c_O$, respectively, wherein $M \leq 11$, $N \leq 11$, and $O \leq 11$. First, the three binary data streams $a_0, a_1, a_2, \ldots, a_M, b_0, b_1, b_2, \ldots, b_N, c_0, c_1, c_2, \ldots, c_O$ are multiplexed into second data streams $\bar{a}_0, \bar{a}_1, \bar{a}_2, \ldots, \bar{a}_I, \bar{b}_0, \bar{b}_1, \bar{b}_2, \ldots, \bar{b}_J, \bar{c}_0, \bar{c}_1, \bar{c}_2, \ldots, \bar{c}_K$ (step 600), wherein $I \leq 11$, $J \leq 11$, and $K \leq 11$. Then, the second data streams $\bar{a}_0, \bar{a}_1, \bar{a}_2, \ldots, \bar{a}_I, \bar{b}_0, \bar{b}_1, \bar{b}_2, \ldots, \bar{b}_J, \bar{c}_0, \bar{c}_1, \bar{c}_2, \ldots, \bar{c}_K$ may be encoded into the third data streams $\tilde{a}_0, \tilde{a}_1, \tilde{a}_2, \ldots, \tilde{a}_{15}, \tilde{b}_0, \tilde{b}_1, \tilde{b}_2, \ldots, \tilde{b}_{15}, \tilde{c}_0, \tilde{c}_1, \tilde{c}_2, \ldots, \tilde{c}_{15}$ though an RM(16, 11) code (steps 602, 604, 606) by which 11-bits streams are encoded to 16-bit streams, wherein the basis sequences of the RM(16, 11) code are defined as Table 2. Further, the third data streams $\tilde{a}_0, \tilde{a}_1, \tilde{a}_2, \ldots, \tilde{a}_{15}, \tilde{b}_0, \tilde{b}_1, \tilde{b}_2, \ldots, \tilde{b}_{15}, \tilde{c}_0, \tilde{c}_1, \tilde{c}_2, \ldots, \tilde{c}_{15}$ are multiplexed to obtain a 48-bit sequence $d_0, d_1, d_2, \ldots, d_{47}$ (i.e., an output data stream) for transmission. As a result, a maximum of 33 effective information bits may be delivered at the same time.

TABLE 2

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0  | 1 | 1 | 1 | 1 | 1 | 1 | 1 | 1 | 1 | 1 | 1 |
| 1  | 1 | 1 | 1 | 1 | 0 | 1 | 1 | 0 | 1 | 0 | 0 |
| 2  | 1 | 1 | 1 | 0 | 1 | 1 | 0 | 1 | 0 | 1 | 0 |
| 3  | 1 | 1 | 1 | 0 | 0 | 1 | 0 | 0 | 0 | 0 | 0 |
| 4  | 1 | 1 | 0 | 1 | 1 | 0 | 1 | 1 | 0 | 0 | 1 |
| 5  | 1 | 1 | 0 | 1 | 0 | 0 | 1 | 0 | 0 | 0 | 0 |
| 6  | 1 | 1 | 0 | 0 | 1 | 0 | 0 | 1 | 0 | 0 | 0 |
| 7  | 1 | 1 | 0 | 0 | 0 | 0 | 0 | 0 | 0 | 0 | 0 |
| 8  | 1 | 0 | 1 | 1 | 1 | 0 | 0 | 0 | 1 | 1 | 1 |
| 9  | 1 | 0 | 1 | 1 | 0 | 0 | 0 | 0 | 1 | 0 | 0 |
| 10 | 1 | 0 | 1 | 0 | 1 | 0 | 0 | 0 | 0 | 1 | 0 |
| 11 | 1 | 0 | 1 | 0 | 0 | 0 | 0 | 0 | 0 | 0 | 0 |
| 12 | 1 | 0 | 0 | 1 | 1 | 0 | 0 | 0 | 0 | 0 | 1 |
| 13 | 1 | 0 | 0 | 1 | 0 | 0 | 0 | 0 | 0 | 0 | 0 |
| 14 | 1 | 0 | 0 | 0 | 1 | 0 | 0 | 0 | 0 | 0 | 0 |
| 15 | 1 | 0 | 0 | 0 | 0 | 0 | 0 | 0 | 0 | 0 | 0 |

Noticeably, there are multiple ways to implement the functions in the encoding scheme 60. Specifically, the three binary data streams $a_0, a_1, a_2, \ldots, a_M, b_0, b_1, b_2, \ldots, b_N, c_0, c_1, c_2, \ldots, c_O$ may be multiplexed into the second data streams $\bar{a}_0, \bar{a}_1, \bar{a}_2, \ldots, \bar{a}_I, \bar{b}_0, \bar{b}_1, \bar{b}_2, \ldots, \bar{b}_J, \bar{c}_0, \bar{c}_1, \bar{c}_2, \ldots, \bar{c}_K$ by separation, interleaving, partial interleaving, or permutation. For examples, if separation is applied, each bit in the second data streams $\bar{a}_0, \bar{a}_1, \bar{a}_2, \ldots, \bar{a}_I, \bar{b}_0, \bar{b}_1, \bar{b}_2, \ldots, \bar{b}_J, \bar{c}_0, \bar{c}_1, \bar{c}_2, \ldots, \bar{c}_K$ may be obtained by following the expression below:

$$\begin{cases} \bar{a}_i = a_i, 1 \leq i \leq I = M \\ \bar{b}_j = b_j, 1 \leq j \leq J = N \\ \bar{c}_k = c_k, 1 \leq k \leq K = O \end{cases}$$

If interleaving is applied, the second data streams $\bar{a}_0, \bar{a}_1, \bar{a}_2, \ldots, \bar{a}_I, \bar{b}_0, \bar{b}_1, \bar{b}_2, \ldots, \bar{b}_J, \bar{c}_0, \bar{c}_1, \bar{c}_2, \ldots, \bar{c}_K$ may be expressed as follows:

$$\bar{a}_1, \bar{a}_2, \ldots, \bar{a}_I, \bar{b}_1, \bar{b}_2, \ldots, \bar{b}_J, \bar{c}_1, \bar{c}_2, \ldots, \bar{c}_K, I=J\pm2=K\pm2=a_1,b_1,c_1, \ldots, a_O, b_O, c_O, a_{O+1}, b_{O+1}, \ldots, a_N, b_N, a_{N+1}, \ldots, a_M, \text{ if } O \leq N \leq M$$

where $I+J+K=M+N+O$ for all possible values of M, N, and O. In addition, in steps 602, 604, 606, the encoding matrices (i.e., basis sequences for RM(16, 11)) are defined in Table 2, but should not be limited thereto. The encoding matrices may be alternated by any possible row and column permutations to obtain the third data streams $\tilde{a}_0, \tilde{a}_1, \tilde{a}_2, \ldots, \tilde{a}_{15}, \tilde{b}_0, \tilde{b}_1, \tilde{b}_2, \ldots, \tilde{b}_{15}, \tilde{c}_0, \tilde{c}_1, \tilde{c}_2, \ldots, \tilde{c}_{15}$. Furthermore, the third data streams $\tilde{a}_0, \tilde{a}_1, \tilde{a}_2, \ldots, \tilde{a}_{15}, \tilde{b}_0, \tilde{b}_1, \tilde{b}_2, \ldots, \tilde{b}_{15}, \tilde{c}_0, \tilde{c}_1, \tilde{c}_2, \ldots, \tilde{c}_{15}$ may be multiplexed into the output data stream $d_0, d_1, d_2, \ldots, d_{47}$ by serializing or interleaving. For example, if serializing is applied, each bit in the output data stream $d_0, d_1, d_2, \ldots, d_{47}$ is obtained by following the expression below:

$$\begin{cases} d_s = \tilde{a}_s, 0 \leq s \leq 15 \\ d_s = \tilde{b}_s, 16 \leq s \leq 31 \\ d_s = \tilde{c}_s, 17 \leq s \leq 47 \end{cases}$$

If interleaving is applied, each bit in the output data stream $d_0, d_1, d_2, \ldots, d_{47}$ can be expressed as follows:

$$\begin{cases} d_s = \tilde{a}_{s/3}, & s \bmod 3 = 0 \\ d_s = \tilde{b}_{(s-1)/3}, & s \bmod 3 = 1 \\ d_s = \tilde{c}_{(s-2)/3}, & s \bmod 3 = 2 \end{cases}$$

In another embodiment, multiple CSI reports may need to be jointly encoded with HARQ ACKs/NACKs and/or other control signal such as scheduling request (SR). For example, please refer to FIG. 7, which illustrates a schematic diagram of an encoding scheme 70 according to an embodiment of the present invention. Two CSI reports with ACK/NACK/SR are jointly encoded into a 48-bit data stream to be transmitted to the network simultaneously. Similar to the encoding scheme 60 mentioned above, there are multiple ways to implement the functions in the encoding scheme 70. For example, the three binary data streams $a_0, a_1, a_2, \ldots, a_M, b_0, b_1, b_2, \ldots, b_N, c_0, c_1, c_2, \ldots, c_O$ corresponding to the two CSI reports and the ACK/NACK/SR feedbacks may be multiplexed into the second data streams $\bar{a}_0, \bar{a}_1, \bar{a}_2, \ldots, \bar{a}_I, \bar{b}_0, \bar{b}_1, \bar{b}_2, \ldots, \bar{b}_J, \bar{c}_0, \bar{c}_1, \bar{c}_2, \ldots, \bar{c}_K$ (step 700) by separation, interleaving, partial interleaving, permutation, or their combinations, wherein $M \leq 11$, $N \leq 11$, $O \leq 11$, $I \leq 11$, $J \leq 11$, and $K \leq 11$. For examples, if separation is applied, each bit in the second data streams $\bar{a}_0, \bar{a}_1, \bar{a}_2, \ldots, \bar{a}_I, \bar{b}_0, \bar{b}_1, \bar{b}_2, \ldots, \bar{b}_J, \bar{c}_0, \bar{c}_1, \bar{c}_2, \ldots, \bar{c}_K$ may be obtained by following the expression below:

$$\begin{cases} \bar{a}_i = a_i, 1 \leq i \leq I = M \\ \bar{b}_j = b_j, 1 \leq j \leq J = N \\ \bar{c}_k = c_k, 1 \leq k \leq K = O \end{cases}$$

It interleaving is applied, the second data streams $\bar{a}_0, \bar{a}_1, \bar{a}_2, \ldots, \bar{a}_I, \bar{b}_0, \bar{b}_1, \bar{b}_2, \ldots, \bar{b}_J, \bar{c}_0, \bar{c}_1, \bar{c}_2, \ldots, \bar{c}_K$ may be expressed as follows:

$$\bar{a}_1, \bar{a}_2, \ldots, \bar{a}_I, \bar{b}_1, \bar{b}_2, \ldots, \bar{b}_J, \bar{c}_1, \bar{c}_2, \ldots, \bar{c}_K, I=J\pm2=K\pm2=a_1,b_1,c_1, \ldots, a_O, b_O, c_O, a_{O+1}, b_{O+1}, \ldots, a_N, b_N, a_{N+1}, \ldots, a_M, \text{ if } O \leq N \leq M$$

where $I+J+K=M+N+O$ for all possible values of M, N, and O. If partial interleaving is applied, the second data streams $\bar{a}_0, \bar{a}_1, \bar{a}_2, \ldots, \bar{a}_I, \bar{b}_0, \bar{b}_1, \bar{b}_2, \ldots, \bar{b}_J, \bar{c}_0, \bar{c}_1, \bar{c}_2, \ldots, \bar{c}_K$ may be expressed as follows:

$$\bar{a}_1, \bar{a}_2, \ldots, \bar{a}_I, \bar{b}_1, \bar{b}_2, \ldots, \bar{b}_J, I=J\pm1=a_1,b_1, \ldots, a_N, b_N, a_{N+1}, \ldots, a_M, \text{ if } N \leq M. \ \bar{c}_k = c_k, 1 \leq k \leq K = O.$$

where I+J=M+N for all possible values of M, N, and O. If permutation is applied, the second data streams $\bar{a}_0, \bar{a}_1, a_2, \ldots, \bar{a}_I, \bar{b}_0, \bar{b}_1, \bar{b}_2, \ldots, \bar{b}_J, \bar{c}_0, \bar{c}_1, \bar{c}_2, \ldots, \bar{c}_K$ may be expressed as follows:

$$\begin{cases} \bar{a}_k = c_k, 1 \le k \le K = O \\ \bar{b}_j = a_i, 1 \le i \le I = M \\ \bar{c}_j = b_j, 1 \le j \le J = N \end{cases}$$

In addition, in steps 702, 704, 706, the encoding matrices (i.e., basis sequences for RM(16, 11)) are defined in Table 2, but should not be limited thereto. The encoding matrices may be alternated by any possible row and column permutations. Furthermore, the third data streams $\tilde{a}_0, \tilde{a}_1, \tilde{a}_2, \ldots, \tilde{a}_{15}, \tilde{b}_0, \tilde{b}_1, \tilde{b}_2, \ldots, \tilde{b}_{15}, \tilde{c}_0, \tilde{c}_1, \tilde{c}_2, \ldots, \tilde{c}_{15}$ may be multiplexed into the output data stream $d_0, d_1, d_2, \ldots, d_{47}$ (step 708) by serializing, interleaving, or their combinations. For example, if serializing is applied, each bit in the output data stream $d_0, d_1, d_2, \ldots, d_{47}$ is obtained by following the expression below:

$$\begin{cases} d_s = \tilde{a}_s, 0 \le s \le 15 \\ d_s = \tilde{b}_s, 16 \le s \le 31 \\ d_s = \tilde{c}_s, 17 \le s \le 47 \end{cases}$$

If interleaving is applied, each bit in the output data stream $d_0, d_1, d_2, \ldots, d_{47}$ is obtained by following the expression below:

$$\begin{cases} d_s = \tilde{a}_{s/3}, & s \bmod 3 = 0 \\ d_s = \tilde{b}_{(s-1)/3}, & s \bmod 3 = 1 \\ d_s = \tilde{c}_{(s-2)/3}, & s \bmod 3 = 2 \end{cases}$$

Figure 7:
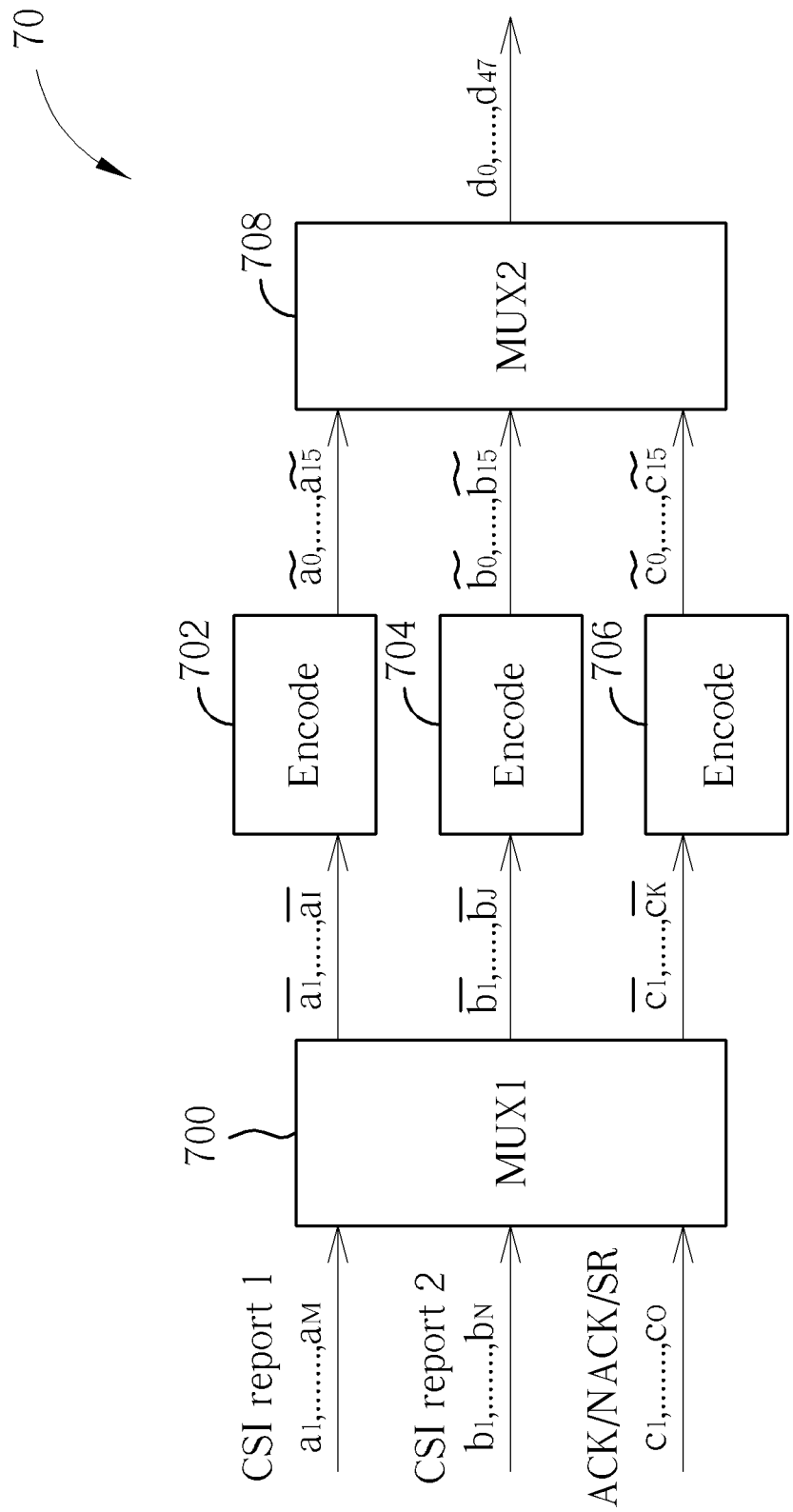
FIG. 7 is a schematic diagram of an encoding scheme according to an example of the present invention.

FIG. 7 illustrates one of embodiments of three input streams, including two input streams of CSI reports and one input stream of ACK/NACK/SR. In another embodiment, those three input streams may be one input stream of CSI report and two input streams of ACK/NACK/SR, which also uses the encoding scheme 70.

Figure 8:
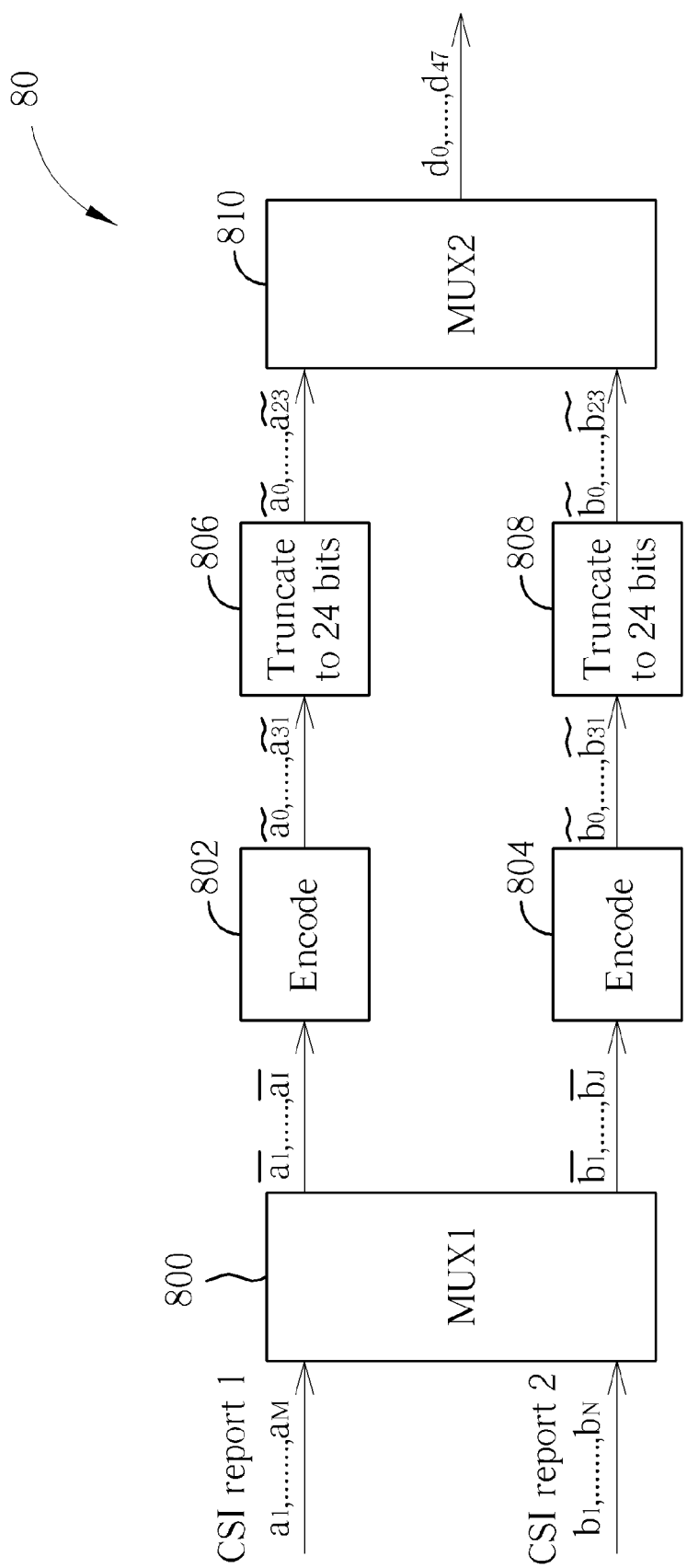
FIG. 8 is a schematic diagram of an encoding scheme according to an example of the present invention.

Please refer to FIG. 8, which illustrates a schematic diagram of an encoding scheme 80 according to an embodiment of the present invention. As shown in FIG. 8, two CSI reports are jointly encoded to be transmitted to the network simultaneously. First, two binary data streams $a_0, a_1, a_2, \ldots, a_M, b_0, b_1, b_2, \ldots, b_N$ corresponding to the two CSI reports may be multiplexed into the second data streams $\bar{a}_0, \bar{a}_1, \bar{a}_2, \ldots, \bar{a}_I, \bar{b}_0, \bar{b}_1, \bar{b}_2, \ldots, \bar{b}_J$ (step 800) by separation, interleaving, partial interleaving, permutation, or their combinations, wherein $M \le 11$, $N \le 11$, $I \le 11$, and $J \le 11$. For examples, if separation is applied, each bit in the second data streams $\bar{a}_0, \bar{a}_1, \bar{a}_2, \ldots, \bar{a}_I, \bar{b}_0, \bar{b}_1, \bar{b}_2, \ldots, \bar{b}_J$ may be obtained by following the expression below:

$$\begin{cases} \bar{a}_i = a_i, 1 \le i \le I = M \\ \bar{b}_j = b_j, 1 \le j \le J = N \end{cases}$$

If interleaving is applied, the second data streams $\bar{a}_0, \bar{a}_1, a_2, \ldots, \bar{a}_I, \bar{b}_0, \bar{b}_1, \bar{b}_2, \ldots, \bar{b}_J$ may be expressed as follows:

$\bar{a}_1, \bar{a}_2, \ldots, \bar{a}_I, \bar{b}_1, \bar{b}_2, \ldots, \bar{b}_J, I \pm 1 = a_1, b_1, a_2,$
$b_2, \ldots, a_M, b_M, a_{M+1}, a_{M+2}, \ldots, a_N$, if $M \le N$.

where I+J=M+N for all possible values of M and N. Then, in steps 802, 804, the second data streams $\bar{a}_0, \bar{a}_1, \bar{a}_2, \ldots, \bar{a}_I, \bar{b}_0, \bar{b}_1, \bar{b}_2, \ldots, \bar{b}_J$ may be encoded into third data streams $\tilde{a}_0, \tilde{a}_1, \tilde{a}_2, \ldots, \tilde{a}_{31}, \tilde{b}_0, \tilde{b}_1, \tilde{b}_2, \ldots, \tilde{b}_{31}$ though an RM(32, 11) code as the encoding matrices in Table 1, wherein the encoding matrices may be alternated by any possible row and column permutations. Since each of the second data streams $\bar{a}_0, \bar{a}_1, a_2, \ldots, \bar{a}_I, \bar{b}_0, \bar{b}_1, \bar{b}_2, \ldots, \bar{b}_J$ multiplied by the encoding matrix of the RM(32, 11) code results in a 32-bit sequence, truncation may be performed in order to comply with the PUCCH format 3 which only contains 48 bits. The user equipment may truncate the last 8 bits for each of the third data streams $\tilde{a}_0, \tilde{a}_1, \tilde{a}_2, \ldots, \tilde{a}_{31}, \tilde{b}_0, \tilde{b}_1, \tilde{b}_2, \ldots, \tilde{b}_{31}$ (steps 806, 808) before multiplexing into an output data stream $d_0, d_1, d_2, \ldots, d_{47}$ (step 810) for transmission. In step 810, the user equipment may multiplex the data streams $\tilde{a}_0, \tilde{a}_1, \tilde{a}_2, \ldots, \tilde{a}_{23}, \tilde{b}_0, \tilde{b}_1, \tilde{b}_2, \ldots, \tilde{b}_{23}$ by serializing, interleaving, or their combinations. For example, if serializing is applied, each bit in the output data stream $d_0, d_1, d_2, \ldots, d_{47}$ is obtained by following the expression below:

$$\begin{cases} d_s = \tilde{a}_s, 0 \le s \le 23 \\ d_s = \tilde{b}_s, 24 \le s \le 48 \end{cases}$$

If interleaving is applied, each bit in the output data stream $d_0, d_1, d_2, d_{47}$ is obtained by following the expression below:

$$\begin{cases} d_s = \tilde{a}_{s/2}, & s \text{ even} \\ d_s = \tilde{b}_{(s-1)/2}, & s \text{ odd} \end{cases}$$

The abovementioned steps of the process 50 and the encoding schemes 60, 70, 80 including suggested steps may be realized by means of hardware, software, firmware, or an electronic system. Examples of hardware may include analog, digital and mixed circuits known as microcircuit, microchip, or silicon chip. Examples of the electronic system may include a system on chip (SOC), system in package (SiP), a computer on module (COM), and the communication device 40.

In the prior art, a UE can simultaneously transmit HARQ ACKs/NACKs with only a maximum of 20 effective information bits for TDD or a maximum of 10 effective information bits for FDD with the PUCCH format 3. Also, when multiple CSI reports are scheduled to be transmitted at the same time, a UE transmits only one CSI report and other CSI reports may be dropped. In comparison, the present invention provides a method for jointly encoding multiple CSI reports, HARQ feedbacks and/or other control signals. By using this method, multiple CSI reports, HARQ feedbacks and/or other control signals containing more effective information bits may be delivered at the same time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of jointly encoding channel state information (CSI) reports and hybrid automatic repeat request (HARQ)

feedbacks for a user equipment in a wireless communication system, the method comprising:
  generating a first data stream based on a plurality of input streams of CSI reports or a combination of a plurality of input streams of CSI reports and HARQ feedbacks; and
  transmitting the first data stream to a network of the wireless communication system,
  wherein generating the first data stream based on the plurality of input streams of CSI reports or the combination of the plurality of input streams of CSI reports and HARQ feedbacks comprises:
    multiplexing the plurality of input streams of CSI reports or the combination of the plurality of input streams of CSI reports and HARQ feedbacks into a plurality of second data streams;
    encoding the plurality of second data streams into a plurality of third data streams through a Reed-Muller code; and
    multiplexing the plurality of third data streams into the first data stream.

2. The method of claim 1, wherein the step of multiplexing the plurality of input streams of CSI reports or the combination of the plurality of input streams of CSI reports and HARQ feedbacks into the plurality of second data streams comprises:
  multiplexing the plurality of input streams of CSI reports or the combination of the plurality of input streams of CSI reports and HARQ feedbacks into the plurality of second data streams by separation, interleaving, partial interleaving, or permutation.

3. The method of claim 1, wherein the step of multiplexing the plurality of third data streams into the first data stream comprises:
  multiplexing the plurality of third data streams into the first data stream by serializing or interleaving.

4. The method of claim 1, wherein the Reed-Muller code is an RM(16,11) code.

5. The method of claim 1, wherein the plurality of second data streams are generated by multiplexing three input data streams of CSI reports without HARQ feedback, by multiplexing two input data streams of CSI reports and one input stream of HARQ feedbacks, or by multiplexing one input stream of CSI report and two input streams of HARQ feedbacks.

6. The method of claim 1, wherein when the plurality of second data stream are generated by multiplexing two CSI reports, the method further comprising:
  after the plurality of second data streams have been encoded into the plurality of third data streams through the Reed-Muller code, truncating the plurality of third data streams before multiplexing the plurality of third data streams into the first data stream, wherein the Reed-Muller code is an RM(32,11) code.

7. A communication apparatus for jointly encoding channel state information (CSI) reports and hybrid automatic repeat request (HARQ) feedbacks, the communication apparatus comprising:
  a processing means;
  a storage unit; and
  a program code, stored in the storage unit, wherein the program code instructs the processing means to execute the following steps:
  generating a first data stream based on a plurality of input streams of CSI reports or a combination of a plurality of input streams of CSI reports and HARQ feedbacks; and
  transmitting the first data stream to a network of the wireless communication system,
  wherein the step of generating the first data stream based on the plurality of input streams of CSI reports or the combination of the plurality of input streams of CSI reports and HARQ feedbacks comprises:
    multiplexing the plurality of input streams of CSI reports or the combination of the plurality of input streams of CSI reports and HARQ feedbacks into a plurality of second data streams;
    encoding the plurality of second data streams into a plurality of third data streams through a Reed-Muller code; and
    multiplexing the plurality of third data streams into the first data stream.

8. The communication apparatus of claim 7, wherein the step of multiplexing the plurality of input streams of CSI reports or the combination of the plurality of input streams of CSI reports and HARQ feedbacks into the plurality of second data streams comprises:
  multiplexing the plurality of input streams of CSI reports or the combination of the plurality of input streams of CSI reports and HARQ feedbacks into the plurality of second data streams by separation, interleaving, partial interleaving, or permutation.

9. The communication apparatus of claim 7, wherein the step of multiplexing the plurality of third data streams into the first data stream comprises:
  multiplexing the plurality of third data streams into the first data stream by serializing or interleaving.

10. The communication apparatus of claim 7, wherein the Reed-Muller code is an RM(16,11) code.

11. The communication apparatus of claim 7, wherein the plurality of second data streams are generated by multiplexing three input data streams of CSI reports without HARQ feedback, by multiplexing two input data streams of CSI reports and one input streams of HARQ feedbacks, or by multiplexing one input stream of CSI report and two input streams of HARQ feedbacks.

12. The communication apparatus of claim 7, wherein when the plurality of second data stream are generated by multiplexing two CSI reports, the program code further instructs the processing means to execute the following steps:
  truncating the plurality of third data streams before multiplexing the plurality of third data streams into the first data stream, wherein the Reed-Muller code is an RM(32, 11) code.

* * * * *